United States Patent [19]

Chappel

[11] 4,041,579

[45] Aug. 16, 1977

[54] JEWELRY CLASP AND METHOD OF MAKING SAME

[76] Inventor: Barry H. Chappel, Dublin Road, P.O. Box 69, Southbury, Conn. 06488

[21] Appl. No.: 676,292

[22] Filed: Apr. 12, 1976

[51] Int. Cl.² .................... A44B 13/00; A44B 21/00
[52] U.S. Cl. ............................. 24/230 AK; 24/239; 29/160.6
[58] Field of Search .......... 24/230 AK, 230 AM, 239, 24/265 SH; 29/160.6

[56] References Cited

U.S. PATENT DOCUMENTS

| 712,955 | 11/1902 | Parsley | 24/239 |
| 2,571,971 | 10/1951 | Vogel | 24/239 |

*Primary Examiner*—Bernard Gelak
*Attorney, Agent, or Firm*—Leonard L. Kalish

[57] ABSTRACT

A clasp or connector for detachably fastening to each other the two ends of jewelry chains, necklaces, bracelets or the like. The clasp includes an elongated planar base-plate having a loop-receiving or link-receiving hole or loop at one end thereof, to which the terminal link of the chain, necklace or bracelet may be secured, and having a short link-receiving post at the other end thereof over which the other terminal link of the chain, necklace or bracelet may be placed when the clasp is in its open condition. An elongated slider-mounting box-like portion surmounts and is formed integrally with the base-plate and has an elongated spring-chamber therein which is open at the top and whose longitudinal walls have planar upper slider-bed surfaces adjacent the spring-chamber, and has longitudinal slider-guides extending upwardly from the side-walls of the spring chamber adjacent said longitudinal slider-beds, with their inner walls inclined inwardly and interlockingly and slidably engaging similarly inclined longitudinal side-walls of the slider resting on said slider-beds. The slider has a planar bottom surface in operative alignment with the upper surface of the link-receiving post. A spring engages the slider in the direction of the link-receiving post.

19 Claims, 17 Drawing Figures

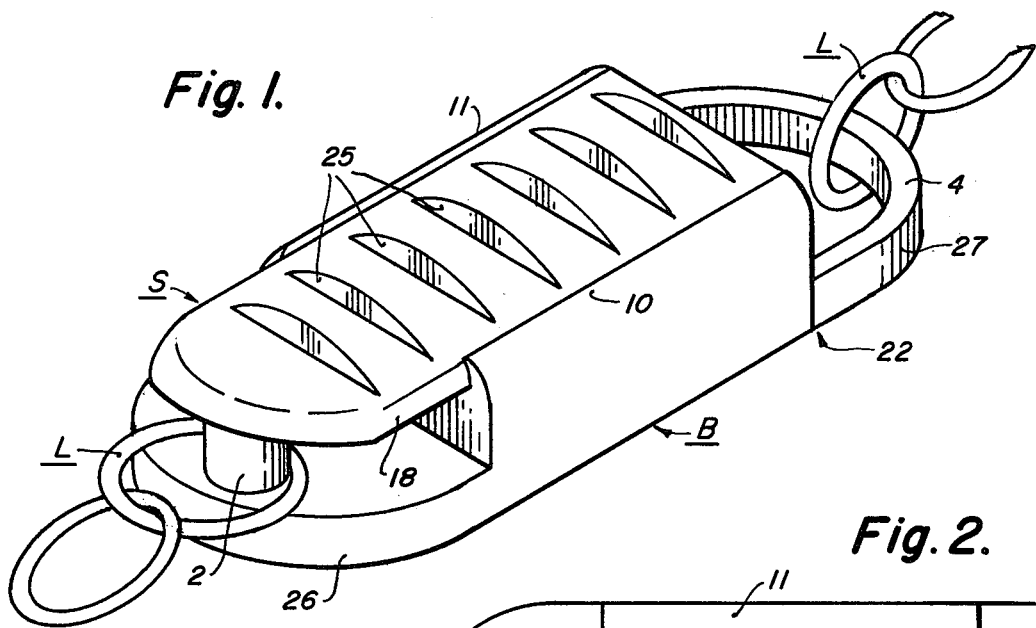
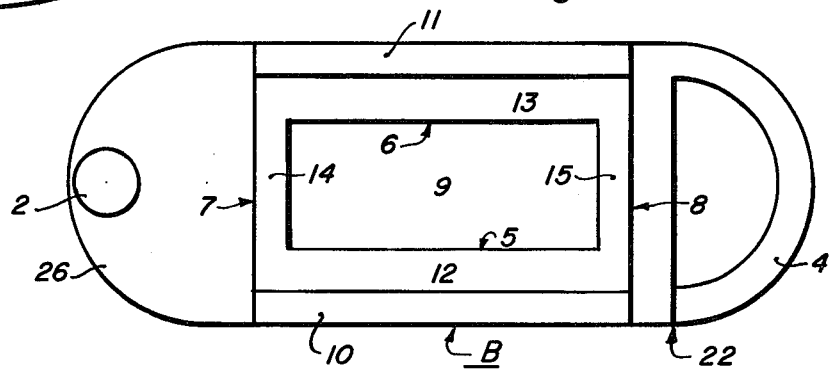
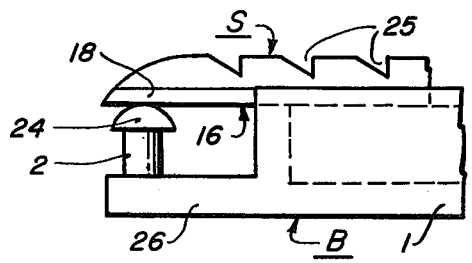
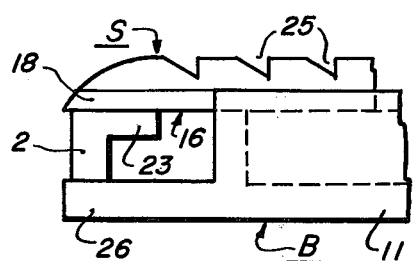

JEWELRY CLASP AND METHOD OF MAKING SAME

THE FIELD AND OBJECTS OF THE INVENTION

The invention relates to connectors or clasps for detachably fastening to each other the two ends of jewelry chains, necklaces, bracelets or the like.

An object of the present invention is a clasp which can easily be operated by holding the clasp between the thumb and the index-finger (or between the thumb and the middle-finger) of one hand.

A further object of the invention is a jewelry clasp or connector which can be more easily operated than the jewelry chains or connectors now in common use, notwithstanding the small size of the clasp or connector of the present invention.

A further object of the present invention is an easily operable small jewelry clasp or connector which can be mass-produced at a low cost and is composed of only two die-cast or injection-moulded parts, plus a spring, and whereby each of such two parts can be inexpensively made of a die-castable or injection-mouldable metal or alloy such as, for example, zinc or a suitable zinc alloy, or of a sinterable metal, or can be injection-moulded of a suitable strong plastic, and then assembled to each other by operatively interposing the spring between the base and the slider and bending or swaging the two longitudinal slider-guides of the base inwardly into operative inter-engagement with the inclined longitudinal side-surfaces of the slider.

BRIEF DESCRIPTION OF THE DRAWINGS

In the accompanying drawings, like reference-numbers indicate like parts or elements.

FIG. 1 represents a much enlarged perspective view of one embodiment of a jewelry clasp or connector of the present invention.

FIG. 2 represents a top plan view of the base of the clasp shown in FIG. 1.

FIG. 16 represents a fragmentary side elevational view of the clasp, showing a modified form of post.

FIG. 17 represents a fragmentary side elevational view of the clasp, showing another modified form of post.

DESCRIPTION OF THE EMBODIMENT OF THE INVENTION ILLUSTRATED IN THE DRAWINGS

The clasp of the present invention comprises two die-cast or injection-moulded or sintered members, namely, the main member or body-member or base B and the slider S.

Figure 13:
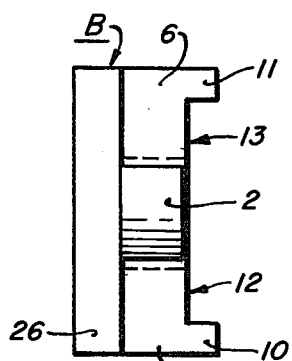
FIG. 13 represents an end elevational view of the base shown in FIG. 12, viewed on line 13—13 of FIG. 12.
Figure 12:
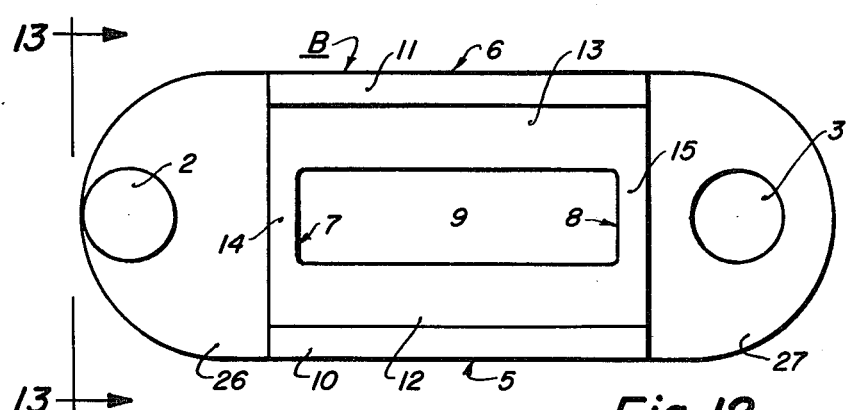
FIG. 12 represents a top plan view of the base of the clasp shown in FIGS. 3 to 11 (inclusive) prior to the bending or swaging inwardly of its two longitudinal slider-guides 10 and 11.
Figure 15:
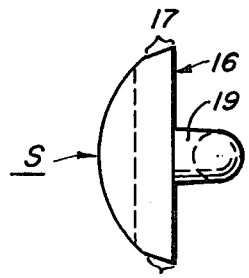
FIG. 15 represents an end view of the slider shown in FIG. 14, as viewed on line 15—15 of FIG. 14.
Figure 14:
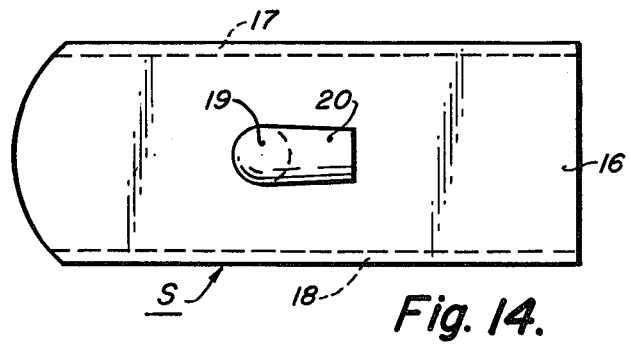
FIG. 14 represents a bottom plan view of the slider.

The base B, by itself, and before its two longitudinal slider-guides are bent or swaged or otherwise deformed inwardly, is shown in FIGS. 12 and 13 and also in a somewhat modified form in FIG. 2. The slider S is shown by itself in FIGS. 14 and 15.

The base B includes an elongated planar base-plate 1 having a link-receiving post 2 at one end thereof and a link-receiving hole 3 at the other end thereof, or in the alternative or modified form shown in FIGS. 1 and 2 the base plate 1 has a link-engaging loop 4 at the same end thereof;- all for engaging chain-links L.

Extending upwardly from the base-plate 1 and formed integrally therewith is a box-like slider-support having opposite longitudinal side-walls 5 and 6, and end-walls 7 and 8, which together form the walls of the elongated spring-chamber 9 therebetween.

Longitudinal slider-guides 10 and 11 entend upwardly from and are formed integrally with the longitudinal walls 5 and 6 along the outer marginal zones thereof, as shown in FIGS. 2, 11, 12 and 13.

Figure 3:
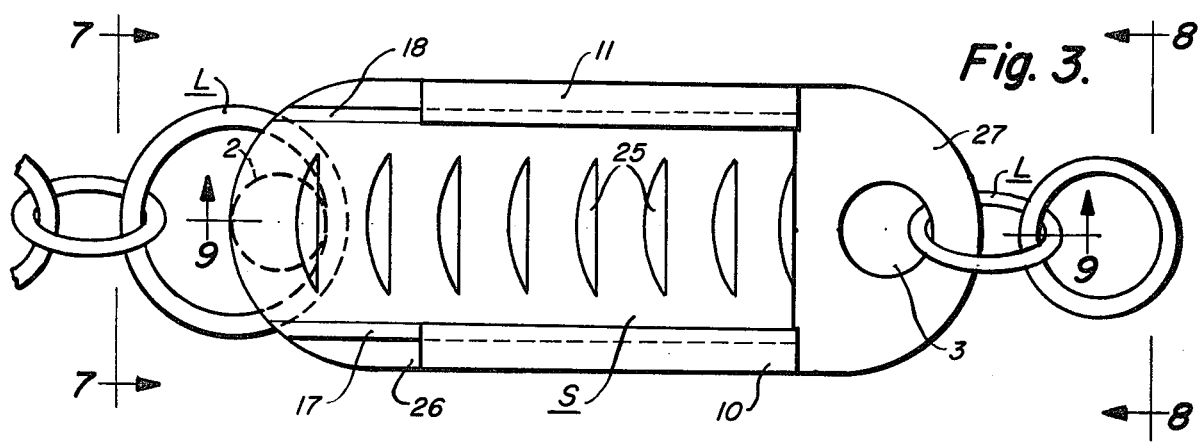
FIG. 3 represents a top plan view of the clasp of the present invention in its closed condition, with a link-receiving hole at one end thereof in place of the link-receiving loop at the same end of the base as shown in FIG. 1.
Figure 4:
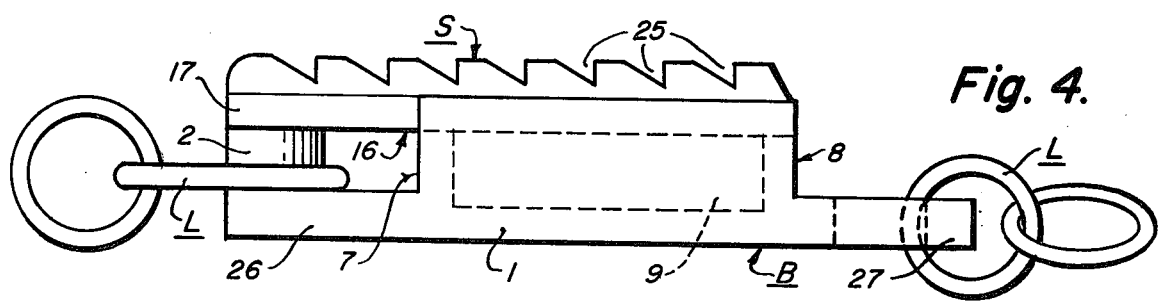
FIG. 4 represents a side elevational view of the closed clasp shown in FIG. 3.
Figure 5:
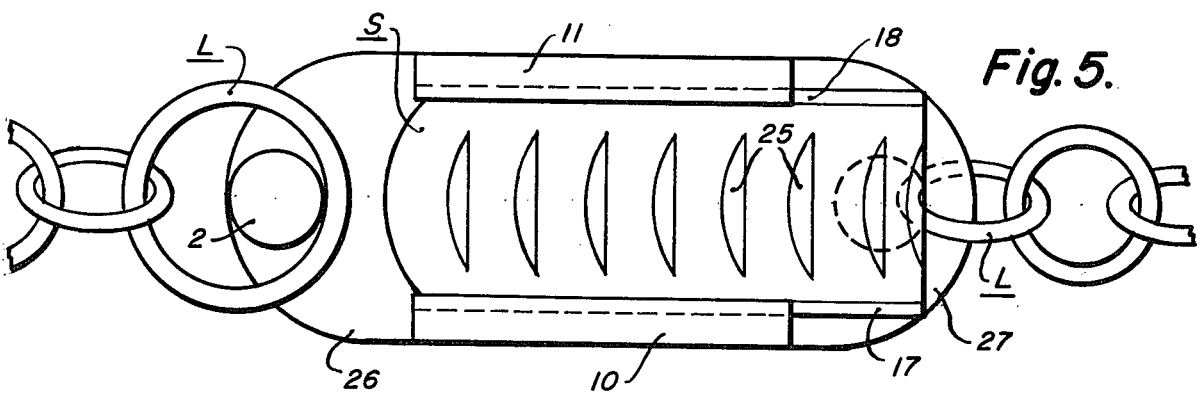
FIG. 5 represents a top plan view of the clasp shown in FIG. 3, but with the slider thereof shown in its retracted or open position.
Figure 6:
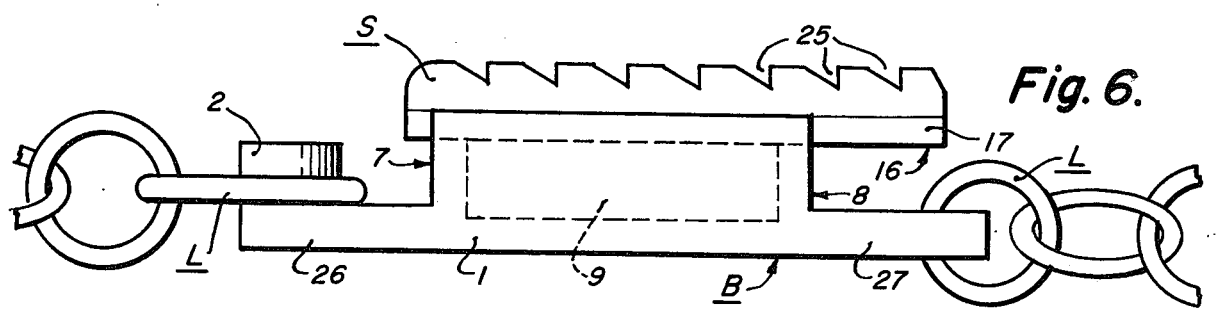
FIG. 6 represents a side elevational view of the clasp shown in FIGS. 3, 4 and 5, with the slider thereof shown in its retracted or open position.
Figure 9:
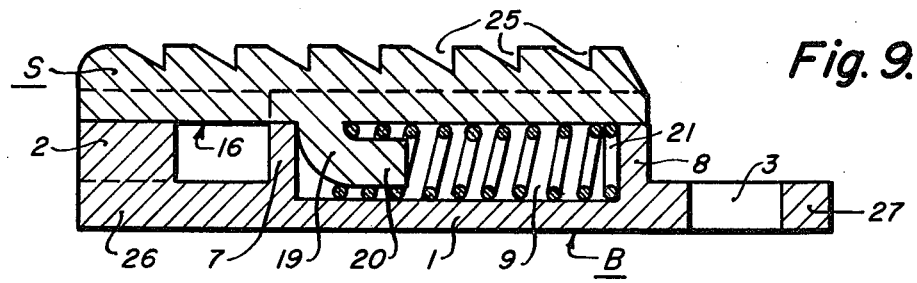
FIG. 9 represents a vertical cross-sectional view of the clasp on line 9—9 of FIG. 3.

The slider S is sufficiently longer than the over-all longitudinal dimension of the box-like slider-support formed of walls 5, 6, 7 and 8 that when the slider is in its closed position shown in FIGS. 1, 3, 4 and 9, the end of the slider nearest the post 2 will over-ride the flat top of the post in close proximity thereto as shown in FIGS. 4 and 9, while the oppostie end of the slider will overlie the end-wall 8 of the spring-chamber 9.

The opposite horizontal co-planar upper surfaces 12 and 13 of the longitudinal walls 5 and 6 (as well as the co-planar upper surfaces 14 and 15 of the end-walls 7 and 8) form a slider-supporting bed on which the planar bottom surface 16 of the slider S slidably rests and is slidably retained by the inwardly bent or swaged or otherwise inwardly deformed slider-guides 10 and 11, which are so inwardly deformed after the slider S has been placed on the slider-bed (12, 13, 14 and 15), and such deformation slidably interlocks the slider-guides 10 and 11 with the inclined longitudinal side-surfaces 17 and 18 of the slider S, as shown more particularly in FIGS. 7, 8, 11 and 1.

A spring-abutment 19 extends downwardly from the bottom 16 of the slider S, into the chamber 9, and has a horizontal spring-pilot 20 extending therefrom in a direction away from the linkpost 2.

A helical compression-spring 21 is operately interposed between the spring-abutment 19 and the end-wall 8 of the spring-chamber 9, with its pilot 20 extending into one or two of the convolutions of the spring, so as to center that end of the spring and to keep it in balanced contact with the spring-abutment 19.

The following is a preferred method of making my jewelry clasp. The slider S and the base B are first die-cast or injection-molded. Thereafter, the slider S is moved towards the base B along a travel-path inclined at about 30° to its slider-bed surfaces (12, 13, 14 and 15) while the longitudinal median planes of the slider S and of the body B (shown in FIGS. 9 and 10) are in the same common plane as shown in said Figures. Such inclined travel-path is so positioned that it will bring the rear-end of the slider S to the top of the end-wall 8 of the spring-chamber 9.

Figure 7:
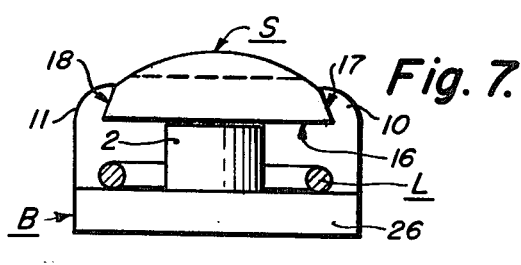
FIG. 7 represents an end elevational view of the clasp shown in FIGS. 3 and 4, viewed on line 7—7 of FIG. 3.
Figure 8:
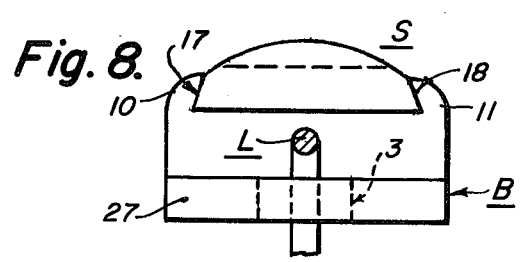
FIG. 8 represents an end elevational view of the clasp shown in FIGS. 3 and 4 viewed on line 8—8 of FIG. 3.
Figure 10:
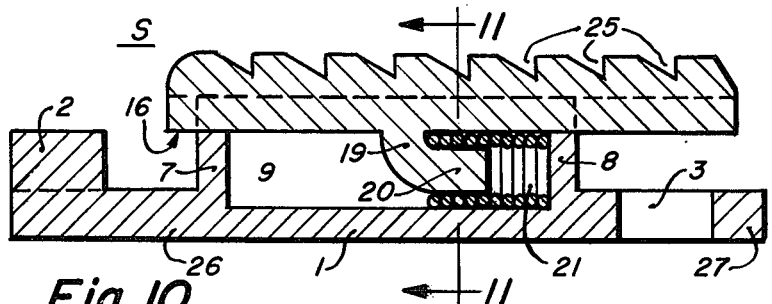
FIG. 10 represents a vertical cross-sectional view of the clasp, similar to FIG. 9, but showing the slider in its retracted or open position.
Figure 11:
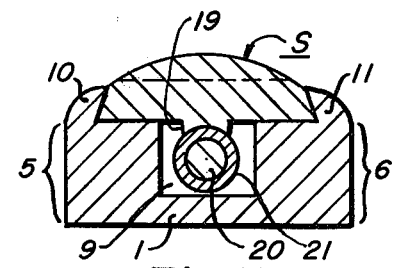
FIG. 11 represents a transverse vertical cross-sectional view of the clasp on line 11—11 of FIG. 10.

Sufficiently in advance of end of said travel-path, a spring 21 is placed in said travel-path in operative alignment with the pilot 20 of the spring-abutment 19, so as to cause the pilot 20 to telescope into one end of the spring 21 and thereby capture the spring. The slider S continues along its travel-path until the free-end of the captured spring 21 is within the spring-chamber 9 and abuts against the end-wall 8 thereof;- whereupon the front-end of the slider S is tilted towards the body B, into a position in which it is fully between the slider-guides 10 and 11 and with its bottom surface 16 parallel with and resting on the slider-bed surfaces 12, 13, 14 and 15, and with the spring 21 compressed as indicated in FIG. 10. Thereafter the slider-guides 10 and 11 are bent, swaged or deformed inwardly into operative juxtaposition to the inclined side-surfaces 17 and 18 of the slider S as indicated in FIGS. 7, 8 and 11 so as operatively to interengage with said inclined side-surfaces 17 and 18.

The aforementioned mounting on the slider S on the slider-bed surfaces and the simultaneous operative interposition of the spring 21 between the spring-abutment 19 and the end-wall 8 of the spring-chamber 9 may also be done in the following manner. The slider S (with a spring 21 mounted to its spring-abutment 19 and pilot 20) may be mounted on the slider-bed surfaces (12, 13, 14 and 15) between the slider-guides (10 and 11) without first inclining or tilting the slider in relation to the slider-bed surfaces. Thus, the slider S may be mounted on the slider-bed surfaces by bringing the slider and the base together while they are parallel with each other, by compressing the spring 21 with two opposed thin blade-like fingers while the slider and the base are moved towards each other in parallel relation with each other, until such fingers come in contact with the slider-bed surfaces 12 and 13 and with the bottom surface 16 of the slider, when the free end of the spring 21 in partial contact with the end-wall 8 of the spring-chamber, and then withdrawing such fingers and thereafter completing the slight additional movement of the slider towards the slider-bed surfaces until the slider rests on such surfaces. Thereafter the longitudinal slider-guides 10 and 11 are deformed inwardly so as to interengage with the side-surfaces 17 and 18 of the slider S, as indicated hereinabove.

The base B, including its base-plate 1 and its upwardly rising walls 5, 6, 7 and 8 and the link-post 2 thereof and its slider-guides 10 and 11, with its link-hole 3 or loop 4, are all formed integrally with each other, preferably by die-casting or injection-moulding of a suitable metal or alloy as for example a zinc alloy having sufficient strength and cold ductility (or malleability) to permit the slider-guides 10 and 11 to be bent inwardly about 17°, more or less, without fracture or significant weakening, or may be injection-moulded of a likewise suitable plastic. The slider S, including its spring-anchorage 19 and spring-pilot 20, are likewise formed integrally with each other preferably by die-casting or injection-moulding or sintering of suitable metal or alloy or by injection-moulding or casting or a suitable plastic. As used hereinafter, including the following claims, the word "cast" (when used alone) is intended to encompass both the die-cast and the injection-moulded and sintered species, and the word "metal" (when used alone) is intended also to encompass a metal alloy. The base B and the slider S may also be formed of thin sheet-metal.

In the modified embodiment shown in FIGS. 1 and 2, the loop 4 may have both of its ends integral with the base-plate 1, or one end of the loop 4 may be severed from the base-plate 1, so that the loop may be bent or merely sprung outwardly slightly, so as to form a temporary gap at 22 just sufficiently to pass therethrough the link of the chain with the loop 4.

In the modified embodiment shown in FIG. 16, the post 2 is provided with an inwardly extending horizontal extension 23.

In the modified embodiment shown in FIG. 17, the post 2 is provided with a slightly enlarged head 24.

A series of spaced-apart grooves 25 are extended across the upper curved top of the slider S as indicated in FIGS. 3 to 11 and in FIG. 1. The sides of the grooves facing in the direction of the post 2 are generally vertical, while the other sides of the grooves are inclined, so that when the thumb is applied to the top of the slider S, the grooves will provide a firm engagement with the thumb to permit the thumb to move the slider S against the force of the spring 21.

While in the accompanying drawings, particularly in FIGS. 7, 8, 11 and 15, the guide-engaged side-surfaces 17 and 18 of the slider S are shown as being inclined planar surfaces, such surfaces (17 and 18) may also be curved in vertical cross-section, and the slidable interengagement between the guides 10 and 11 and the sides 17 and 18 of the slider may also be provided by forming the sides 17 and 18 in two off-set portions, with the lower portion being the outer one and the upper portion being offset inwardly therefrom, and correspondingly deforming the guides 10 and 11 slidably to interengage with such curved or rabbeted side-surfaces of the slider, and as used in the following claims the term "inclined" is intended also to encompass such curved and such rabbeted side-surfaces.

In order to permit better graphic illustration of my jewelry clasp, the accompanying drawings are much enlarged in relation to the actual size of my clasp, although FIGS. 3 to 15 inclusive are generally proportioned to my clasp. For purposes of exemplification, the following illustrates a suitable size of my jewelry clasp.

The over-all length of the base plate 1 (and also the overall length of the clasp) is 0.500 inch, and the width of the base-plate and also the width of the clasp as a whole is 0.187 inch. The height of the clasp as a whole is 0.120 inch. The distance between the outer surfaces of the end-walls 7 and 8 namely, the length of the box-like portion of the base B is 0.250 inch. The distance between the upright slide-guides 10 and 11 as originally formed and prior to their inward deformation as shown in FIGS. 12 and 13, is of the order of 0.147 inch (+0.003 inch & −0.000 inch) and the width of said slide-guides is 0.020 inch and the height thereof is likewise 0.020 inch as shown in FIGS. 12 and 13. The longitudinal dimension of each of the two end portions 26 and 27 of the base-plate (beyond the end-walls 7 and 8) is 0.125 inch, and the vertical thickness of said terminal portions (26 and 27) is 0.031 inch. The height of the post 2 (above the terminal portion 26 of the base-plate 1) is 0.039 inch, and the plane of the slider-bed surfaces 12 and 13 (and 14 and 15) is level with the top of the link-post 2, so that when the slider S over-rides the post 2 in its closed position shown in FIGS. 1, 3, 4, 9, 16 and 17, the chain-link L can not be disengaged from the link-post 2. The over-all length of the slider S is 0.375 inch and the transverse width thereof is 0.137 inch (+0.003 inch and −0.000 inch) and its over-all vertical height is 0.050 inch.

The foregoing dimensions illustrate the capacity of my invention to provide a very small and yet effective, easily operable, durable and reliable jewelry clasp which can be massproduced at a low cost.

It is to be understood however that the foregoing dimensions may be varied somewhat without departing from the spirit of my invention.

The spring-abutment 19 serves to limit the forward or closing movement of the slider S in the direction of the link-receiving post 2 when it comes into contact with the front end-wall 7 of the spring-chamber 9 under the influence of the spring 21, and thereby determines the position of the slider when the clasp is closed, as shown in FIG. 9. The combination of the spring-abutment 19 and the spring 21 serve to limit the rearward opening movement of the slider S when the spring 21 is compressed between the spring-abutment 19 and the rear end-wall 8 of the spring-chamber 9, and thereby determines the position of the slider when the clasp is fully open, as indicated in FIG. 10. These two slider-position-determining means, in combination with the interengagement between the side-walls 17 and 18 and the slider-guides 10 and 11 maintains the slider S and base B in assembled and operative relation to each other.

The spring abutment 19 is so positioned on the bottom of the slider S that when it abuts against the front end-wall 7 of the spring-chamber 9, it will stop the forward motion of the slider S when the front end thereof has overlapped the post 2 of the base B (as indicated in FIG. 9).

When the spring 21 is compressed, its length is such that it will stop the rearward retraction of the slider S while the major portion of the slider is still embraced by the slider-guides 10 and 11 (as indicated in FIGS. 10 and 11).

Having shown and described an embodiment of my invention, I claim the following:

1. A jewelry clasp including an elongated base having a box-like portion open at the top and having walls surmounting the bottom of the base and having a spring-chamber between said walls, said walls having upper slider-bed surfaces for slidably supporting the below-mentioned slider for straight-line longitudinal to-and-fro sliding motion in relation to the base, a slider resting on said slider-bed surfaces and having longitudinal side-surfaces inclined inwardly in an upward direction, two opposite longitudinal slider-guides extending upwardly from said walls and flanking said side-surfaces of said slider and inclined in relation thereto so as slidably to interengage therewith to retain the slider on said slider-bed surfaces and to guide the slider for to-and-fro straight-line longitudinal motion in relation to the base, a link-receiving post carried by said base in front of said box-like portion thereof and spaced therefrom in a longitudinal direction, the top of said post being in operative alignment with said slider-bed surfaces so that the slider can be moved longitudinally thereon to over-ride the top of the post in close proximity thereto, a spring-abutment extending downwardly from said slider into said spring-chamber, a spring operatively interposed between said spring-abutment and an end of said spring-chamber and arranged to urge the slider in the direction of said post, and a link-anchorage at the opposite end of said base.

2. A jewelry clasp according to claim 1, in which all portions of the base are cast integrally with each other and in which all portions of the slider are cast integrally with each other.

3. A jewelry clasp according to claim 1, in which all portions of the base are die-cast integrally with each other and in which all portions of the slider are integrally die-cast with each other.

4. A jewelry clasp according to claim 1, in which all portions of the base of injection-moulded integrally with each other and in which all portions of the slider are injection-moulded integrally with each other.

5. A jewelry clasp according to claim 1, which the slider-guides are deformed inwardly into operative inter-engagement with the inclined side-surfaces of the slider after the slider has been mounted on the slider-bed surfaces between said slider-guides.

6. A jewelry clasp according to claim 3, which the slider-guides are deformed inwardly into operative inter-engagement with the inclined side-surfaces of the slider after the slider has been mounted on the slider-bed surfaces between said slider-guides.

7. A jewelry clasp according to claim 3, in which the slider-guides are deformed inwardly into operative inter-engagement with the inclined side-surfaces of the slider after the slider has been mounted on the slider-bed surfaces between said slider-guides.

8. A jewelry clasp according to claim 4, in which the slider-guides are deformed inwardly into operative interengagement with the inclined surfaces of the slider after the slider has been mounted on the slider-bed surfaces between said slider-guides.

9. A jewelry clasp according to claim 1, in which alternating depressions and peaks are provided in the upper surfaces of the slider for facilitating the retraction thereof against the force of the spring.

10. A jewelry clasp according to claim 1, in which the upper surface of the slider has alternate grooves and ridges crosswise thereof arranged to facilitate the retraction of the slider against the force of the spring.

11. A jewelry clasp according to claim 1, in which the spring-abutment serves as a stop limiting the forward and rearward motions of the slider in relation to the base.

12. A jewelry clasp according to claim 1, in which the spring-abutment serves as a stop limiting the forward motion of the slider in relation to the base and in which the spring and the spring-abutment together act as a stop limiting the rearward travel of the slider in relation to the base.

13. The method of making jewelry clasps which consists of forming an elongated clasp-base having a box-like portion surmounting its bottom and open at its top and having walls and a spring-chamber between said walls and having slider-bed surfaces on top of said walls and opposed longitudinal slider-guides flanking said slider-bed surfaces on the outside thereof and extending upwardly therefrom, and a link-receiving post on said base in front of and having a height generally the same as that of said box-like portion, and forming an elongated slider with longitudinal side-surfaces inclined inwardly in an upward direction and with a spring-abutment extending downwardly from the bottom surface of the slider, mounting said slider on said slider-bed surfaces between said slider-guides and with its spring-abutment extending into said spring-chamber and generally simultaneously interposing a spring between said spring-abutment and an end of said spring-chamber to urge said slider in the direction of said post, and thereafter deforming said slider-guides inwardly towards and into operative interengagement with said inclined side-surfaces of said slider, thereby to maintain said slider and said base in assembled relation to each other with the slider slidable in relation to the base for rectilinear to-and-fro motion.

14. A method according to claim 13, in which the mounting of the slider on the slider-bed surfaces between the slider-guides includes moving the slider rearwardly towards the base along an inclined travel-path terminating at the rear end-wall of the spring-chamber, with the spring-pilot of the spring-abutment of the slider facing in the direction of the travel, interposing a spring in said travel-path in axial alignment with the spring-pilot and causing the spring-pilot to telescope into spring and to capture the spring during the travel of the slider along said travel-path, causing the free end of the so captured spring to abut against the inner surface of the rear end-wall of the spring-chamber at the end of the travel of the slider, and then tilting the slider towards and into parallel relation with the slider-bed-surfaces of the base until the bottom surface of the slider is parallel and in contact with the slider-bed-surfaces of the base.

15. A method according to claim 13, in which the clasp-base is cast with all parts thereof cast integrally and in which the slider is cast with all parts thereof cast integrally.

16. A method according to claim 14, in which the clasp-base is cast with all parts thereof cast integrally and in which the slider is cast with all parts thereof cast integrally.

17. A method according to claim 13, in which the base is die-cast with all parts thereof die-cast integrally and in which the slider is die-cast and all parts thereof die-cast integrally.

18. A method according to claim 14, in which the clasp-base is die-cast with all parts thereof die-cast integrally and in which the slider is die-cast with all the parts thereof die-cast integrally.

19. A method according to claim 13, in which the base is cast of a metal having sufficient strength and sufficient cold ductility to permit the slider-guides to be bent inwardly about 17°, more or less, without fracture or significant weakening.

* * * * *